United States Patent
Tenginakai et al.

(10) Patent No.: US 10,614,240 B2
(45) Date of Patent: Apr. 7, 2020

(54) ACCESSING AN ENCRYPTED FILE SYSTEM

(71) Applicant: INTERNATIONAL BUSINESS MACHINES CORPORATION, Armonk, NY (US)

(72) Inventors: Jyoti B. Tenginakai, Gadag (IN); Saurabh Desai, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 15/816,444

(22) Filed: Nov. 17, 2017

(65) Prior Publication Data

US 2019/0156050 A1 May 23, 2019

(51) Int. Cl.
G06F 21/62 (2013.01)
H04L 9/08 (2006.01)
G06F 21/30 (2013.01)
G09C 1/00 (2006.01)

(52) U.S. Cl.
CPC .......... *G06F 21/6227* (2013.01); *G06F 21/30* (2013.01); *G06F 21/6218* (2013.01); *G09C 1/00* (2013.01); *H04L 9/0863* (2013.01); *H04L 9/0894* (2013.01)

(58) Field of Classification Search
CPC .. G06F 21/6227; G06F 21/6218; G06F 21/46; G06F 21/6209; H04L 9/0894; H04L 9/3226; H04L 9/0822
See application file for complete search history.

(56) References Cited

U.S. PATENT DOCUMENTS

| | | | |
|---|---|---|---|
| 7,085,608 B2 | 8/2006 | Anderson et al. |
| 8,074,069 B2 | 12/2011 | Sharma et al. |
| 8,391,495 B2 | 3/2013 | McLaine et al. |
| 9,172,688 B2 | 10/2015 | Duby et al. |
| 2006/0015716 A1 | 1/2006 | Thornton et al. |
| 2015/0143491 A1 | 5/2015 | Nichols et al. |

OTHER PUBLICATIONS

Andreas Pashalidis, Accessing password-protected resources without the password.
IBM, EFS Encrypted File System, https://www.ibm.com/support/knowledgecenter/ssw_aix_72/com.ibm.aix.security/efs_efs.htm, Last visited Feb. 19, 2017.

*Primary Examiner* — Paul E Callahan
(74) *Attorney, Agent, or Firm* — Kunzler Bean & Adamson, PC; Bruce R. Needham

(57) ABSTRACT

An apparatus, method, program product, and system for accessing an encrypted file system are disclosed. A passphrase module receives a passphrase that is one of a plurality of valid passphrases. A key module applies a predefined pattern to the passphrase to determine an encryption key encoded in the passphrase. The encryption key is used to encrypt and decrypt a password for a key store of an encrypted file system. The key store stores encryption keys for the encrypted file system. A key store module unlocks the key store of the encrypted file system using the password for the key store. The password for the key store is decrypted using the determined encryption key.

20 Claims, 6 Drawing Sheets

ACCESSING AN ENCRYPTED FILE SYSTEM

FIELD

The subject matter disclosed herein relates to encrypted file systems and more particularly relates to securely accessing an encrypted file system without exposing the password for opening the encrypted file system.

BACKGROUND

Computers use file systems to control how data is stored and retrieved. Without file systems, information stored on a storage device would be one large body of data with no way to tell where one piece of information stops and the next begins. File systems separate the data into pieces and give each a name, which allows the information to be easily isolated and identified. Some file systems control access to the information that the file system manages, which may include encrypting the information.

SUMMARY

An apparatus, method, and system for accessing an encrypted file system is disclosed. One embodiment of an apparatus includes a passphrase module that receives a passphrase that may be one of a plurality of valid passphrases. The apparatus includes a key module applies a predefined pattern to the passphrase to determine an encryption key encoded in the passphrase. The encryption key may be used to encrypt and decrypt a password for a key store of an encrypted file system. The key store may store encryption keys for the encrypted file system. The apparatus includes a key store module unlocks the key store of the encrypted file system using the password for the key store. The password for the key store is decrypted using the determined encryption key. In various embodiments, at least a portion of the modules include hardware circuits, programmable hardware devices and/or executable code, the executable code stored on one or more computer readable storage media.

One embodiment of a method for accessing an encrypted file system includes receiving a passphrase that may be one of a plurality of valid passphrases. The method includes applying a predefined pattern to the passphrase to determine an encryption key encoded in the passphrase. The encryption key may be used to encrypt and decrypt a password for a key store of an encrypted file system. The key store may store encryption keys for the encrypted file system. The method includes unlocking the key store of the encrypted file system using the password for the key store. The password for the key store is decrypted using the determined encryption key.

One embodiment of a computer program product for accessing an encrypted file system includes a computer readable storage medium having program instructions embodied therewith. The program instructions are readable/executable by a processor to cause the processor to receive a passphrase that may be one of a plurality of valid passphrases. The program instructions are readable/executable by a processor to apply a predefined pattern to the passphrase to determine an encryption key encoded in the passphrase. The encryption key may be used to encrypt and decrypt a password for a key store of an encrypted file system. The key store may store encryption keys for the encrypted file system. The program instructions are readable/executable by a processor to unlock the key store of the encrypted file system using the password for the key store. The password for the key store is decrypted using the determined encryption key.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and shall not be considered to be limiting of scope, the embodiments will be described and explained with additional specificity and detail through the use of the accompanying drawings, in which.

DETAILED DESCRIPTION OF THE INVENTION

Figure 1:
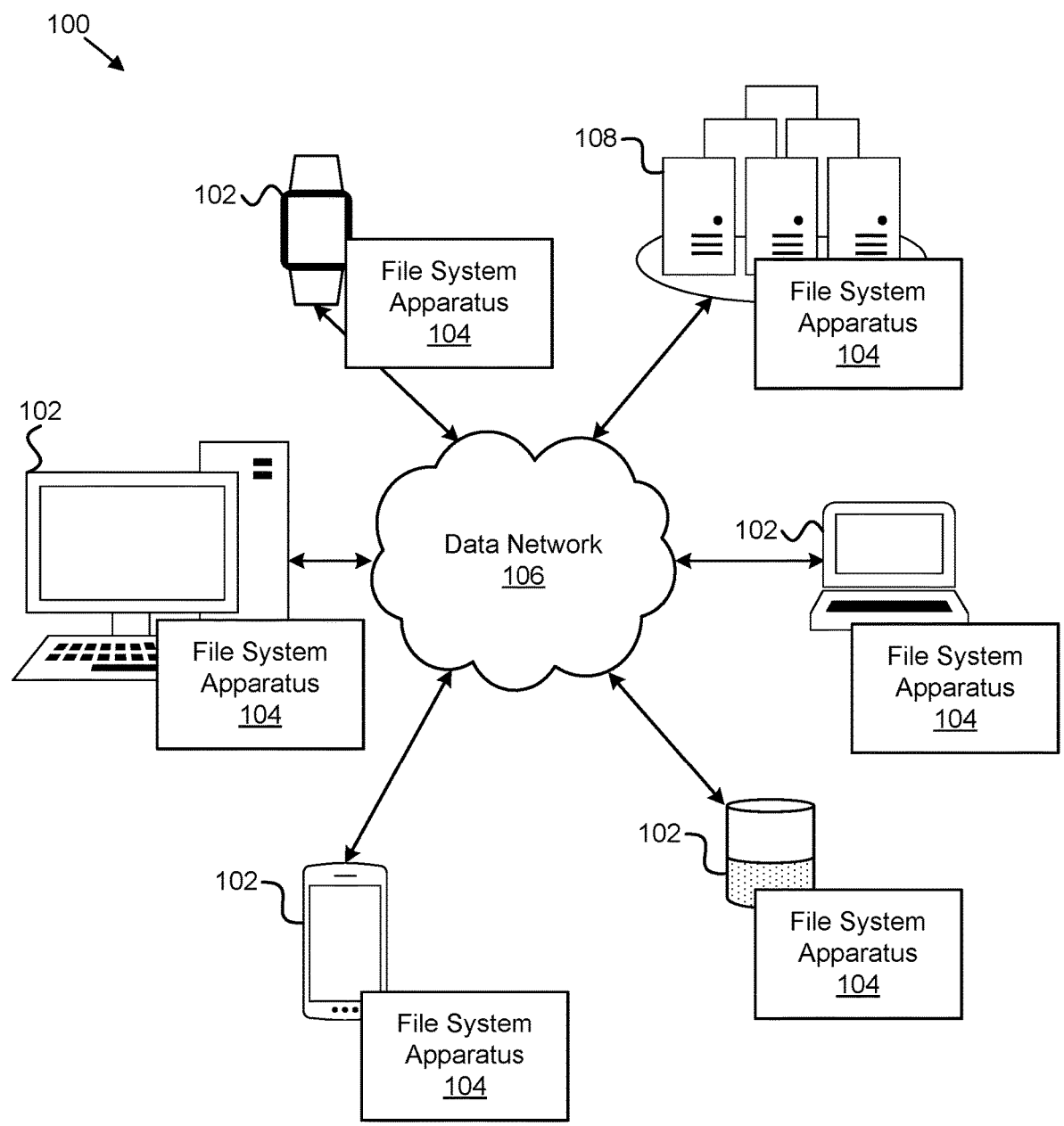
FIG. 1 is a schematic block diagram illustrating one embodiment of a system for accessing an encrypted file system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software as executable code for execution by various types of processors. An identified module of executable code may, for instance, comprise one or more physical or logical blocks of computer instructions which may, for instance, be organized as an object, procedure, or function. Nevertheless, the executable code of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

One embodiment of an apparatus includes a passphrase module that receives a passphrase that may be one of a plurality of valid passphrases. The apparatus includes a key module applies a predefined pattern to the passphrase to determine an encryption key encoded in the passphrase. The encryption key may be used to encrypt and decrypt a password for a key store of an encrypted file system. The key store may store encryption keys for the encrypted file system. The apparatus includes a key store module unlocks the key store of the encrypted file system using the password for the key store. The password for the key store is decrypted using the determined encryption key. In various embodiments, at least a portion of the modules include hardware circuits, programmable hardware devices and/or executable code, the executable code stored on one or more computer readable storage media.

In one embodiment, the passphrase module provides the received passphrase to an unattended background process during execution of the unattended background process. The unattended background process may seek access to the encrypted file system. In further embodiments, the passphrase module provides the passphrase to a command as part of the unattended background process. The command may be configured to unlock the key store using the received passphrase.

In certain embodiments, the passphrase module reads the passphrase from a file in response to the unattended background process attempting to access the encrypted file system without explicitly executing a command to unlock the key store. In various embodiments, the passphrase module opens and reads the file that includes the passphrase in response to determining that a user attribute associated with a logged-in user matches a user-attribute associated with the file.

In one embodiment, the apparatus includes a storage module that encrypts the password using the encryption key and stores the encrypted password in a public portion of the key store for the encrypted file system. In some embodiments, the storage module appends the pattern to the encrypted password prior to storing the encrypted password in the public portion of the key store.

In one embodiment, the pattern indicates a sequential order of characters of the passphrase that includes the encryption key for encrypting and decrypting the password for the key store. In some embodiments, the pattern includes a string of hexadecimal characters. In some embodiments, the apparatus includes a setup module that receives the password and the pattern at the time that the key store is created for the encrypted file system. In some embodiments, the plurality of valid passphrases are each different character strings that produce the same encryption key when the pattern is applied to each of the valid passphrases.

One embodiment of a method for accessing an encrypted file system includes receiving a passphrase that may be one of a plurality of valid passphrases. The method includes applying a predefined pattern to the passphrase to determine an encryption key encoded in the passphrase. The encryption key may be used to encrypt and decrypt a password for a key store of an encrypted file system. The key store may store encryption keys for the encrypted file system. The method includes unlocking the key store of the encrypted file system using the password for the key store. The password for the key store is decrypted using the determined encryption key.

In one embodiment, the method includes providing the received passphrase to an unattended background process during execution of the unattended background process. The unattended background process may seek access to the encrypted file system. In various embodiments, the method includes providing the passphrase to a command as part of the unattended background process. The command may be configured to unlock the key store using the received passphrase.

In various embodiments, the method includes reading the passphrase from a file in response to the unattended background process attempting to access the encrypted file system without explicitly executing a command to unlock the key store. In certain embodiments, the method includes opening and reading the file that includes the passphrase in response to determining that a user attribute associated with a logged-in user matches a user-attribute associated with the file.

In one embodiment, the method includes encrypting the password using the encryption key, appending the pattern to the encrypted password, and storing the encrypted password with the appended pattern in a public portion of the key store for the encrypted file system. In some embodiments, the pattern indicates a sequential order of characters of the passphrase that includes the encryption key for encrypting and decrypting the password for the key store. In various embodiments, the method includes receiving the password and the pattern at the time that the key store is created for the encrypted file system.

One embodiment of a computer program product for accessing an encrypted file system includes a computer readable storage medium having program instructions embodied therewith. The program instructions are readable/executable by a processor to cause the processor to receive a passphrase that may be one of a plurality of valid passphrases. The program instructions are readable/executable by a processor to apply a predefined pattern to the passphrase to determine an encryption key encoded in the passphrase. The encryption key may be used to encrypt and decrypt a password for a key store of an encrypted file system. The key store may store encryption keys for the encrypted file system. The program instructions are readable/executable by a processor to unlock the key store of the encrypted file system using the password for the key store. The password for the key store is decrypted using the determined encryption key.

FIG. 1 depicts one embodiment of a system 100 for accessing an encrypted file system. In certain embodiments, the system 100 includes one or more information handling devices 102, one or more file system apparatuses 104, one or more data networks 106, and one or more servers 108. In certain embodiments, even though a specific number of information handling devices 102, file system apparatuses 104, data networks 106, and servers 108 are depicted in FIG. 1, one of skill in the art will recognize, in light of this disclosure, that any number of information handling devices 102, file system apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include operating systems that manage file systems for organizing and accessing data stored on a storage device accessible to the information handling devices 102.

In one embodiment, the file system apparatus 104 is configured to receive a passphrase, apply a predefined pattern to the passphrase to determine an encryption key encoded in the passphrase, decrypt a password for an encrypted file system with the encryption key, and unlock the key store to the encrypted file system using the decrypted password, which provides access to the encrypted file system. The file system apparatus 104, including its various sub-modules, may be located on one or more information handling devices 102 in the system 100, one or more servers 108, one or more network devices, and/or the like. The file system apparatus 104 is described in more detail below with reference to FIGS. 3 and 4.

In one embodiment, the file system apparatus 104 improves conventional encrypted file systems by securely providing access to an encrypted file system without exposing the password for the key store. In certain embodiments, for instance, unattended jobs, e.g., background services or tasks, may need to access an encrypted file system to access or save data. Conventionally, instead of prompting for the password, unattended jobs would need to provide the password to unlock the key store and access the encrypted file system in a clear text format, e.g., in a script or file, thus exposing the password and compromising the security of the encrypted file system. The file system apparatus 104 improves upon the security of the encrypted file system by securely providing access to the encrypted file system without exposing the password for unlocking the key store for accessing the encrypted file system.

In various embodiments, the file system apparatus 104 may be embodied as a hardware appliance that can be installed or deployed on an information handling device 102, on a server 108, or elsewhere on the data network 106. In certain embodiments, the file system apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the file system apparatus 104 may include a power interface, a wired and/or wireless network interface, a graphical interface that attaches to a display, and/or a semiconductor integrated circuit device as described below, configured to perform the functions described herein with regard to the file system apparatus 104.

The file system apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the file system apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the file system apparatus 104.

The semiconductor integrated circuit device or other hardware appliance of the file system apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the file system apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102.

Figure 2:
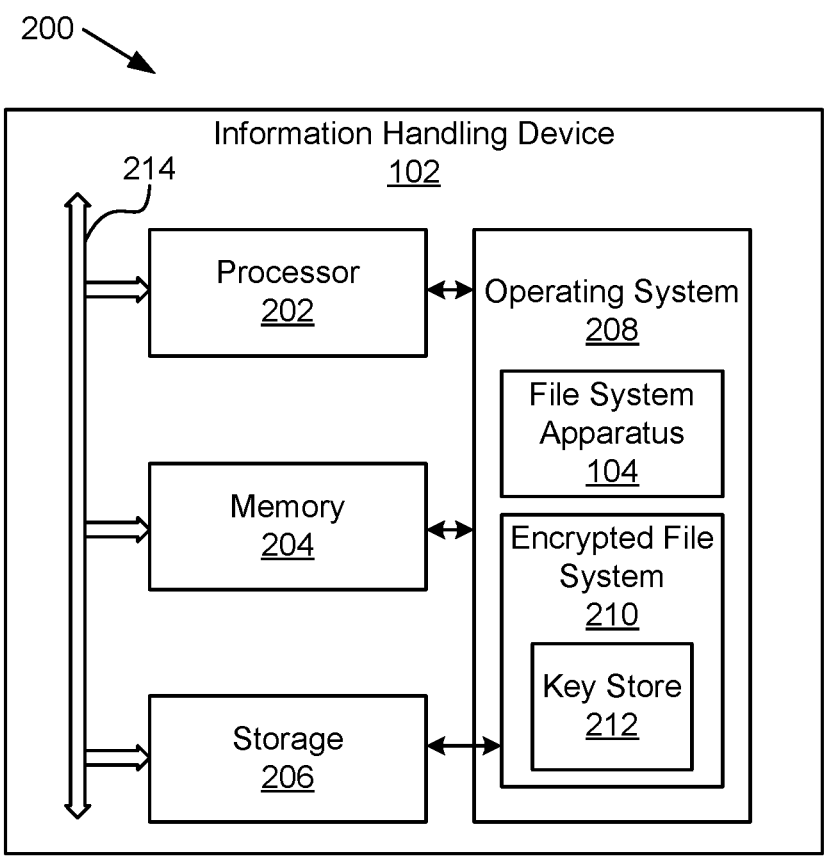
FIG. 2 is a schematic block diagram illustrating one embodiment of a device for accessing an encrypted file system.

FIG. 2 depicts one embodiment of a device 200 for accessing an encrypted file system. In one embodiment, the device 200 includes an instance of an information handling device 102 described above with reference to FIG. 1. In certain embodiments, the information handling device 102 includes one or more processors 202, memory devices 204, storage devices 206, and operating systems 208. The operating systems 208 may include an instance of a file system apparatus 104, an encrypted file system 210, which includes a key store 212, and a bus 214.

The operating system, in one embodiment, may include an instance of Microsoft Windows®, Apple OSX®, Linux®, IBM AIX®, Google Android®, Apple iOS®, and/or the like. The operating system 208 may be natively installed on the information handling device 102, may be installed as a virtual machine on the information handling device 102, and/or the like. The operating system 208 may be in communication with the processor 202, the memory devices 204, the storage devices 206, and/or other components of the information handling device 102 that are not shown, e.g., network card, sound card, video card, etc. For example, the operating system 208, e.g., the components that make up the operating system 208 including executable code, binaries, shared libraries, and/or the like, may be stored in the storage 206 such that all or portions of the operating system 208 may be loaded into the memory 204 for execution by the processor 202. The processor 202, memory 204, and storage 206 may be communicatively coupled over a bus 214.

The operating system 208, in one embodiment, includes an instance of an encrypted file system 210. As used herein, an encrypted file system 210 is a file system that organizes and manages storing and accessing data stored on a storage device in an encrypted manner such that the data is securely accessed and stored. In some embodiments, the encrypted file system 210 is located locally on the information handling device 102 and/or is located on a remote device that is accessible via a data network 106, and/or a combination of local and remote locations. The encrypted file system 210, in one embodiment, includes an instance of a key store 212. The key store 212, in one embodiment, stores keys, passwords, or other credentials for securely accessing the encrypted file system 210.

For instance, in one embodiment, when the encrypted file system 210 is initially created, the file system apparatus 104 may receive a password that is used to access the encrypted file system 210 and store the password in the key store 212. The key store 212 may store other information such as identifiers for users who are allowed to access the encrypted file system 210, the types of access that users may have to the encrypted file system 210, and/or the like. In certain embodiments, the key store 212 may include a public portion and a private portion. The public portion may include information that is freely accessible without a password or other credentials. For instance, the encrypted password for accessing the private portion of the key store 212 may be located in the public portion of the key store 212. The private portion of the key store 212 may store sensitive information for the encrypted file system 210, such as other passwords, metadata, user identifiers, access codes, and/or the like. As described in more detail below, the key store 212 may store information for accessing the encrypted file system 210 without exposing the password in order to increase the security of the encrypted file system 210.

Figure 3:
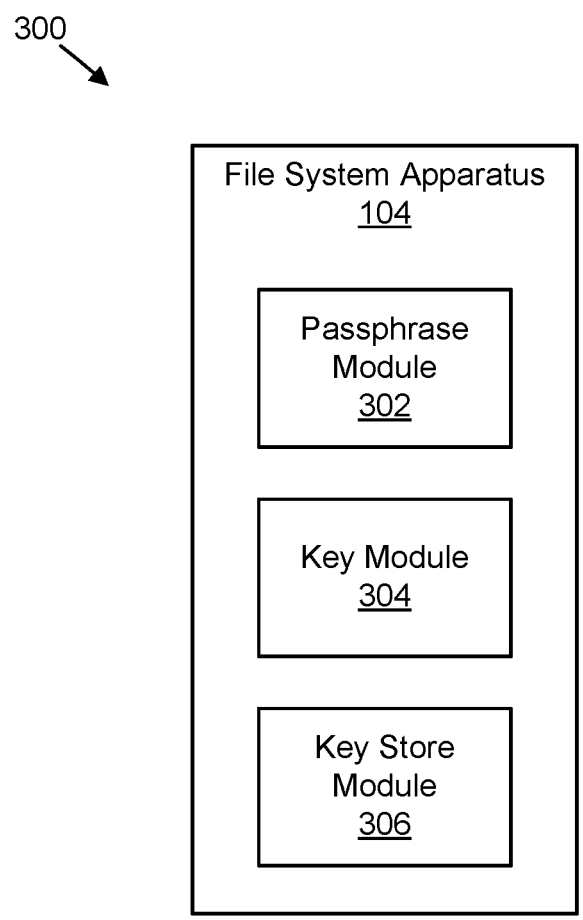
FIG. 3 is a schematic block diagram illustrating one embodiment of an apparatus for accessing an encrypted file system.

FIG. 3 depicts one embodiment of an apparatus 300 for accessing an encrypted file system. The apparatus 300 includes an instance of a file system apparatus 104. The file system apparatus 104 includes one or more of a passphrase module 302 a key module 304, and key store module 306, which are described in more detail below.

The passphrase module 302, in one embodiment, is configured to receive a passphrase. The passphrase, as used herein, includes a string of characters that has an encoded encryption key. The encoded encryption key may be determined by applying a pattern, mask, filter, and/or the like to the passphrase, as described below with reference to the key module 304. In certain embodiments, the passphrase module 302 prompts a user for the passphrase, reads the passphrase from a file, reads the passphrase in a script, accesses the passphrase from a database, and/or the like. In various embodiments, the passphrase may be one of a plurality of valid passphrases that generate the same encryption key when the pattern is applied to the passphrases.

In one embodiment, the key module 304 is configured to apply a predefined pattern to the passphrase to determine an encryption key that is encoded in the passphrase. In one embodiment, the predefined pattern indicates a sequential order of characters of the passphrase that combined make up the encryption key for encrypting and decrypting the password for the key store 212. For example, if the passphrase is the character string "WelC0me2EFS," and the predefined pattern is the hexadecimal string/value "3786A," which indicates that the third, seventh, eighth, sixth, and tenth (A) characters of the passphrase should be selected in that sequential order, then the encryption key would be the string "le2mF." Other predefined patterns or masks may be used, such as binary masks that are applied to a binary representation of the passphrase, and/or other types of character strings, alpha-numeric strings, and/or the like As illustrated above, various different passphrases could be valid passphrases as long as they produce the same encryption key with the applied predefined pattern. For instance, continuing with the above example, applying the pattern "3786A" to the passphrase "6r1s2me2tF49c %2 ns" would generate the same encryption key "le2mF." In this manner, the passphrase may be changed at any time and in any different form so long as the same encryption key can be created when the predefined pattern is applied to the passphrase.

The key module 304, in certain embodiments, uses the encryption key to encrypt and decrypt the password for the key store 212 associated with the encrypted file system 210. The password, in certain embodiments, is the password that is used to access the key store 212 and provide access to the encrypted file system 210. By using the combination of the passphrase and the pattern to generate the encryption key for encrypting and decrypting the password, another level of security is provided to protect the password from being exposed or otherwise misappropriated and compromising the data stored in the encrypted file system 210.

In some embodiments, the key store module 306 unlocks the key store 212 of the encrypted file system 210 using the password for the key store 212 that the key module 304 decrypts using the encryption key derived from the provided passphrase and predefined pattern. Accordingly, the user or process is granted access to the encrypted file system 210 if the password is successfully decrypted and used to unlock the key store 212 for the encrypted file system 210.

In certain embodiments, unattended/scheduled/background jobs, tasks, services, or the like may attempt to access the encrypted file system 210 without interaction from the user. For instance, a "cron" job, e.g., a process that executes according to a schedule managed by the job scheduler utility Cron in Unix, may attempt to access data on the encrypted file system 210. Before the solution disclosed herein, the cron job would need to directly access the password, either in a script or file, in a clear text format, e.g., unencrypted or otherwise unsecured, so that it could access the encrypted file system 210.

However, with the solution described herein, the passphrase module 302 provides the received passphrase, and not the password for the encrypted file system 210, to the unattended background process during execution of the unattended background process. The passphrase may then be used, in combination with the predefined pattern, to determine the encryption key for decrypting the password. If the decryption fails, then the unattended background process will not be allowed to access the encrypted file system 210. In this manner, the password for the encrypted file system 210 is not provided in a clear text format to the unattended background process, which improves the security of the encrypted file system 210 because the password is not out in the open.

In certain embodiments, the passphrase module 302 provides the passphrase to the unattended background process by providing the passphrase to a command that is executed as part of the unattended background process. For instance, the unattended background process may run one or more scripts for performing various tasks that call or execute commands such as commands for opening files, closing files, reading files, and/or the like. One such command may be a command to open the key store 212 using a provided passphrase, e.g., efskeymgr -p<passphrase string>. The passphrase module 302 may populate the <passphrase string> parameter with the received passphrase.

In another embodiment, the passphrase module 302 may read a file that contains the passphrase and provide it to the unattended background process. In certain embodiments, the passphrase module 302 opens and reads the passphrase file in response to the unattended background process attempting to access the encrypted file system 210. In such an embodiment, the passphrase module 302 may detect that the unattended background process is attempting to access the encrypted file system 210, e.g., the passphrase module 302 may detect a command that attempts to access (e.g., read/write) the encrypted file system 210, may detect when the key store 212 is accessed, and/or the like. In response to detecting that the unattended background process is attempting to access the encrypted file system 210, the passphrase module 302 may read one or more passphrases from a file (which a user that scheduled or initiated the unattended background process stored in the file prior to execution of the unattended background process) and provide the one or more passphrases to the unattended background process, which may be used as parameters to commands to access the encrypted file system 210, e.g., the efskeymgr -p<passphrase string>.

In a further embodiment, the passphrase module 302 determines a user attribute, e.g., a user ID, a name, a token, and/or the like of the user that is logged-in when the unattended background process is executed, e.g., the user that initiated the execution of the unattended background process, and compares the determine user attribute with a user attribute associated with the file that contains the passphrases. If the user attributes match, then the passphrase module 302 may read the passphrases from the file and may automatically begin the process to unlock the key store 212 for the encrypted file system 210 without requiring an explicit command from the unattended background process. In this manner, the encrypted file system 210 can be made accessible to the unattended background process without exposing the password for the encrypted file system 210 to the open.

Figure 4:
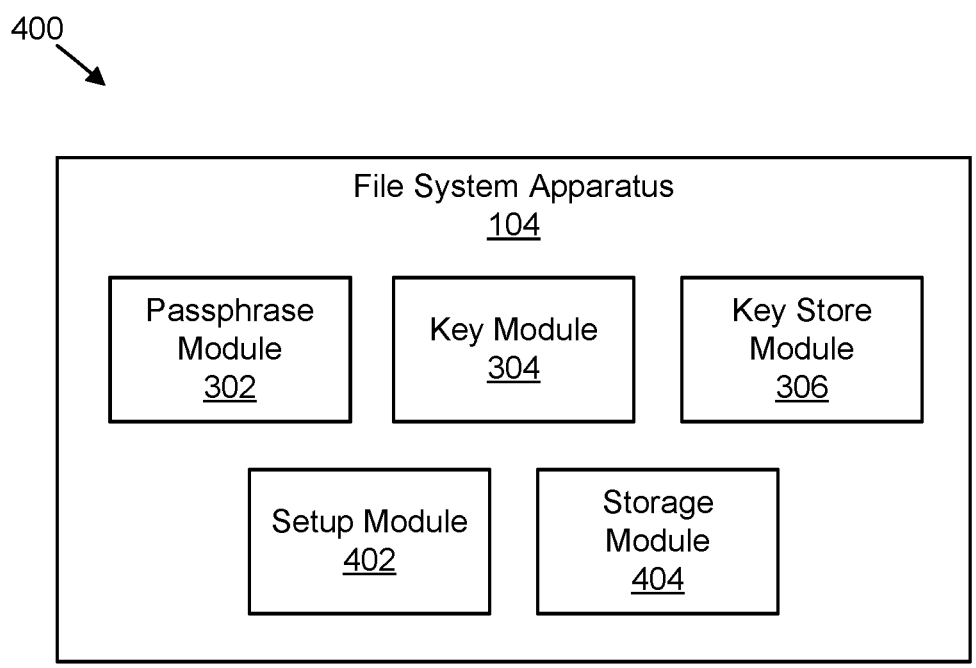
FIG. 4 is a schematic block diagram illustrating one embodiment of another apparatus for accessing an encrypted file system.

FIG. 4 depicts one embodiment of another apparatus 400 for accessing an encrypted file system. The apparatus 400 includes an instance of a file system apparatus 104. The file system apparatus 104 includes one or more of a passphrase module 302, a key module 304, and a key store module 306, which may be substantially similar to the passphrase module 302, the key module 304, and the key store module 306 described above with reference to FIG. 3. The file system apparatus 104 also includes a setup module 402 and/or a storage module 404, which are described in more detail below.

The setup module 402, in one embodiment, is configured to receive the password for the encrypted file system 210 at the time that the key store 212 is created for the encrypted file system 210. For instance, when a user initially sets up the encrypted file system 210, the setup module 402 may prompt the user for the password to use for encrypting the file system. In further embodiments, the setup module 402 may also prompt the user for the predefined pattern and a passphrase in order to generate the encryption key that is used to encrypt and decrypt the password.

As illustrated in the example above, the setup module 402 may receive the pattern "3786A" and the passphrase "WelC0me2EFS." The setup module 402 may then apply the pattern to the passphrase to determine the encryption key to use to encrypt the password. After the password is encrypted with the encryption key, in order to decrypt the password and access the encrypted file system 210, the same encryption key needs to be derived from the application of the pattern to passphrases that are provided after the encrypted file system 210 is setup.

In certain embodiments, when the setup module 402 initially sets up the key store 212 and the encrypted file system 210, the setup module 402 receives the password and an encryption key to use to encrypt and decrypt the password (in addition to a predefined pattern), instead of deriving the encryption key from the pattern and a provided passphrase. Accordingly, after the password is encrypted with the encryption key, in order to decrypt the password and access the encrypted file system 210, the same encryption key needs to be derived from the application of the pattern to passphrases that are provided after the encrypted file system 210 is setup.

The storage module 404, in one embodiment, is configured to encrypt the password using the encryption key and/or store the encrypted password in a public portion of the key store 212 for the encrypted file system 210. In one embodiment, the storage module 404 appends the predefined pattern that the setup module 402 receives to the encrypted password, which may be used to decode a provided passphrase to determine an encryption key. For example, continuing with the example above, the storage module 404 may store the encrypted password in the public portion of the key store 212 as <encrypted password>-3786A. In some embodiments, the storage module 404 stores the encrypted password with the appended pattern as an "AuthCookie" in the key store 212, e.g., an entry in a list, table, or the like that is used for authentication and/or includes authentication information.

Figure 5:
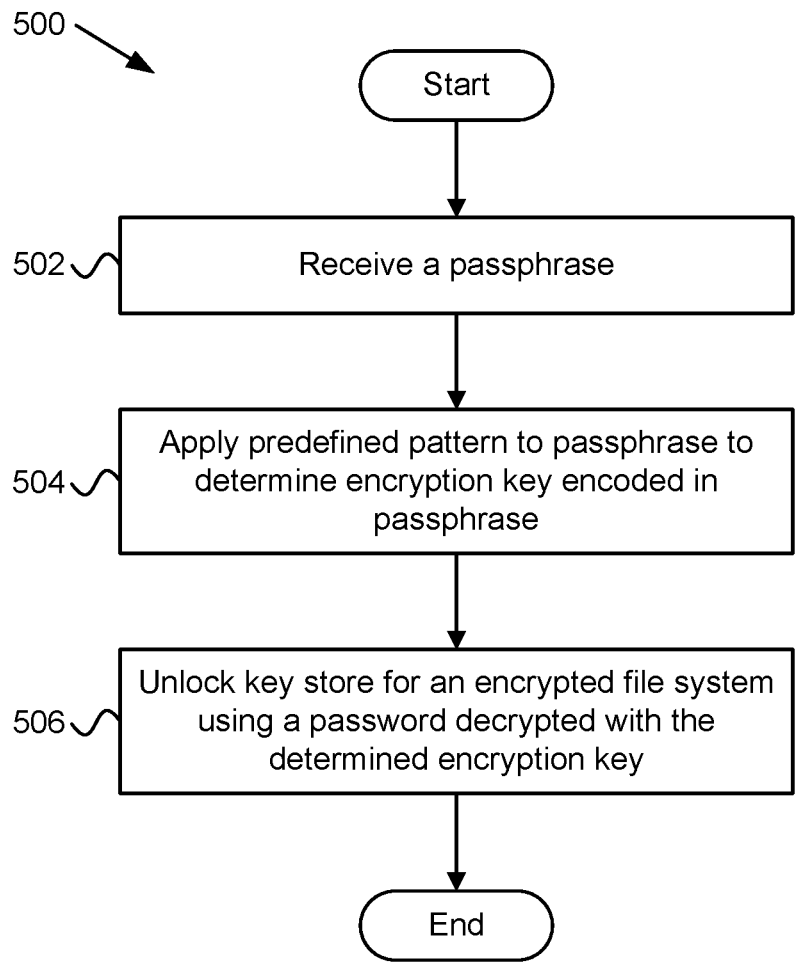
FIG. 5 is a schematic flow chart diagram illustrating one embodiment of a method for accessing an encrypted file system.

FIG. 5 depicts one embodiment of a method 500 for accessing an encrypted file system. In one embodiment, the method 500 begins and receives 502 a passphrase. The passphrase may be one or more plurality of valid passphrases. The method 500, in certain embodiments, applies 504 a predefined pattern to the passphrase to determine an encryption key encoded in the passphrase. The encryption key may be used to encrypt and decrypt a password for a key store 212 of an encrypted file system 210. The key store 212, in various embodiments, stores encryption keys for the encrypted file system 210. In further embodiments, the method 500 unlocks 506 the key store 212 of the encrypted file system 210 using the password for the key store 212. The password for the key store 212 may be decrypted using the determined encryption key, and the method 500 ends. In certain embodiments, the passphrase module 302, the key module 304, and the key store module 306 performs the various steps of the method 500.

Figure 6:
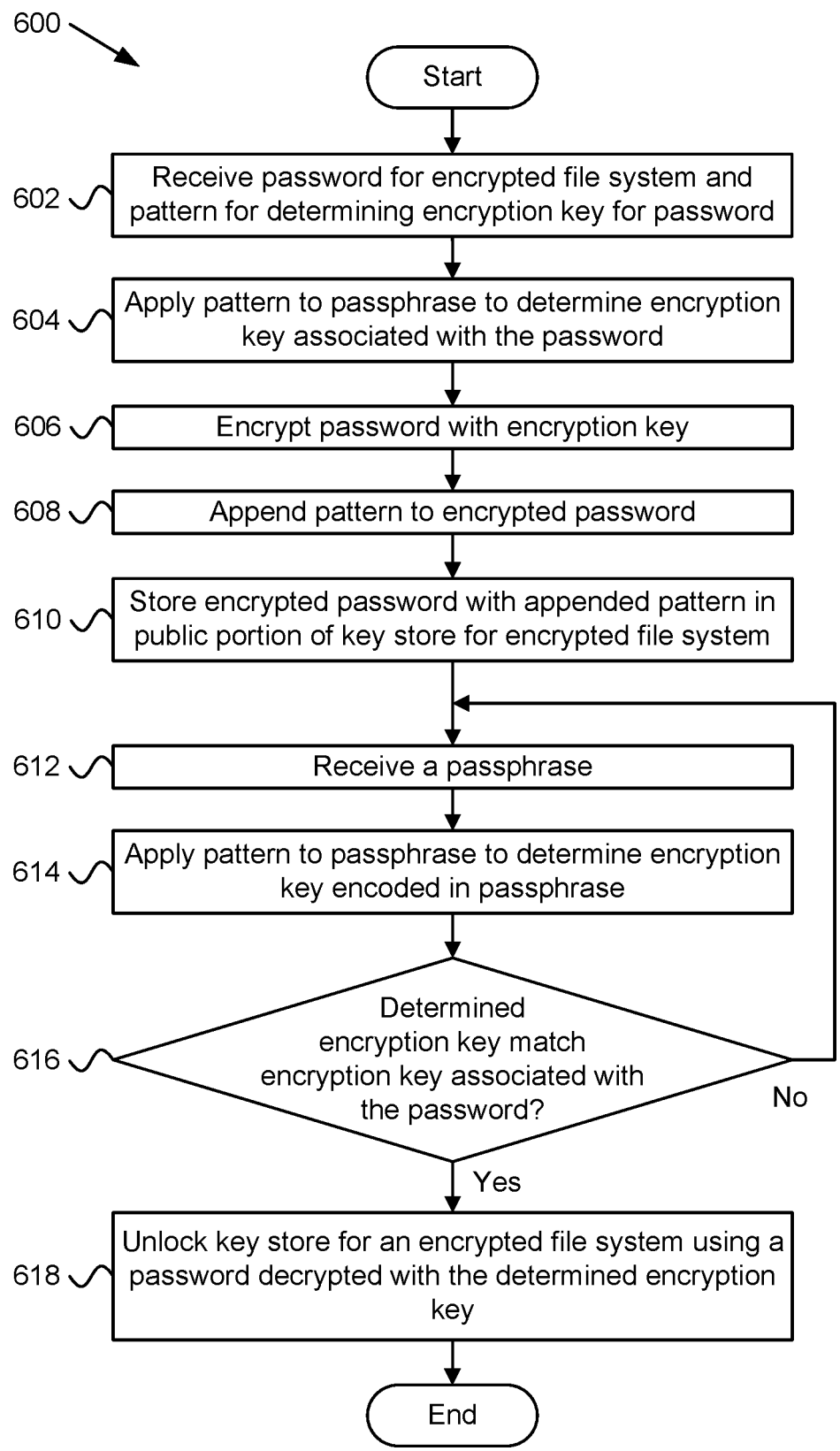
FIG. 6 is a schematic flow chart diagram illustrating one embodiment of another method for accessing an encrypted file system.

FIG. 6 depicts one embodiment of a method 600 for accessing an encrypted file system. In one embodiment, the method 600 begins and receives 602 a password for accessing an encrypted file system 210 and a pattern for determining an encryption key for the password as part of setting up the key store 212 for the encrypted file system 210. In a further embodiment, the method 600 applies 604 the pattern to a provided passphrase to determine the encryption key for the password. The method 600, in certain embodiments, encrypts 606 the password with the determined encryption key.

The method 600, in one embodiment, appends 608 the pattern to the encrypted password, and stores 610 the encrypted password with the appended pattern in a public portion of the key store 212 for the encrypted file system 210. In further embodiments, the method 600 receives 612 a passphrase, and applies 614 the predefined pattern to the passphrase to determine the encryption key encoded in the passphrase. The method 600 determines 616 whether the determined encryption key matches the encryption key that is associated with the password (by decrypting the encrypted password, for instance), e.g., the encryption key that was generated when the key store 212 was initially created. If the method 600 determines 616 that the encryption keys do not match, the method 600 continues to receive passphrases as part of accessing the encrypted file system 210. Otherwise, the method 600 unlocks 618 the key store 212 for the encrypted file system 210 using the password that is decrypted using the determined encryption key, and the method 600 ends. In one embodiment, the passphrase module 302, the key module 304, the key store module 306, the setup module 402, and the storage module 404 perform the various steps of the method 600.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a passphrase module that receives a passphrase, the passphrase being one of a plurality of valid passphrases;
 a key module that applies a predefined pattern to the passphrase to determine an encryption key encoded in the passphrase, the encryption key used to encrypt and decrypt a password for a key store of an encrypted file system, the key store storing encryption keys for the encrypted file system; and
 a key store module that unlocks the key store of the encrypted file system using the password for the key store, the password for the key store decrypted using the determined encryption key,
 wherein at least a portion of said modules comprise one or more of hardware circuits, programmable hardware devices and executable code, the executable code stored on one or more computer readable storage media.

2. The apparatus of claim 1, wherein the passphrase module provides the received passphrase to an unattended background process during execution of the unattended background process, the unattended background process seeking access to the encrypted file system.

3. The apparatus of claim 2, wherein the passphrase module provides the passphrase to a command as part of the unattended background process, the command configured to unlock the key store using the received passphrase.

4. The apparatus of claim 2, wherein the passphrase module reads the passphrase from a file in response to the unattended background process attempting to access the encrypted file system without explicitly executing a command to unlock the key store.

5. The apparatus of claim 4, wherein the passphrase module opens and reads the file comprising the passphrase in response to determining that a user attribute associated with a logged-in user matches a user-attribute associated with the file.

6. The apparatus of claim 1, further comprising a storage module that encrypts the password using the encryption key and stores the encrypted password in a public portion of the key store for the encrypted file system.

7. The apparatus of claim 6, wherein the storage module appends the pattern to the encrypted password prior to storing the encrypted password in the public portion of the key store.

8. The apparatus of claim 1, wherein the pattern indicates a sequential order of characters of the passphrase that comprise the encryption key for encrypting and decrypting the password for the key store.

9. The apparatus of claim 1, wherein the pattern comprises a string of hexadecimal characters.

10. The apparatus of claim 1, further comprising a setup module that receives the password and the pattern at a time that the key store is created for the encrypted file system.

11. The apparatus of claim 1, wherein the plurality of valid passphrases are each different character strings that produce the same encryption key when the pattern is applied to each of the valid passphrases.

12. A method comprising:
receiving a passphrase, the passphrase being one of a plurality of valid passphrases;
applying a predefined pattern to the passphrase to determine an encryption key encoded in the passphrase, the encryption key used to encrypt and decrypt a password for a key store of an encrypted file system, the key store storing encryption keys for the encrypted file system; and
unlocking the key store of the encrypted file system using the password for the key store, the password for the key store decrypted using the determined encryption key.

13. The method of claim 12, further comprising providing the received passphrase to an unattended background process during execution of the unattended background process, the unattended background process seeking access to the encrypted file system.

14. The method of claim 13, further comprising providing the passphrase to a command as part of the unattended background process, the command configured to unlock the key store using the received passphrase.

15. The method of claim 13, further comprising reading the passphrase from a file in response to the unattended background process attempting to access the encrypted file system without explicitly executing a command to unlock the key store.

16. The method of claim 15, further comprising opening and reading the file comprising the passphrase in response to determining that a user attribute associated with a logged-in user matches a user-attribute associated with the file.

17. The method of claim 12, further comprising:
encrypting the password using the encryption key;
appending the pattern to the encrypted password; and
storing the encrypted password with the appended pattern in a public portion of the key store for the encrypted file system.

18. The method of claim 12, wherein the pattern indicates a sequential order of characters of the passphrase that comprise the encryption key for encrypting and decrypting the password for the key store.

19. The method of claim 12, further comprising receiving the password and the pattern at a time that the key store is created for the encrypted file system.

20. A computer program product comprising a computer readable storage medium having program instructions embodied therewith, the program instructions readable/executable by a processor to cause the processor to:
receive a passphrase, the passphrase being one of a plurality of valid passphrases;
apply a predefined pattern to the passphrase to determine an encryption key encoded in the passphrase, the encryption key used to encrypt and decrypt a password for a key store of an encrypted file system, the key store storing encryption keys for the encrypted file system; and
unlock the key store of the encrypted file system using the password for the key store, the password for the key store decrypted using the determined encryption key.

\* \* \* \* \*